US008904536B2

(12) United States Patent
Breitenbacher

(10) Patent No.: US 8,904,536 B2
(45) Date of Patent: Dec. 2, 2014

(54) HEURISTIC METHOD OF CODE ANALYSIS

(75) Inventor: Zdenek Breitenbacher, Brno (CZ)

(73) Assignee: AVG Netherlands B.V., Amsterdam (NL)

( * ) Notice: Subject to any disclaimer, the term of this patent is extended or adjusted under 35 U.S.C. 154(b) by 502 days.

(21) Appl. No.: 12/548,747

(22) Filed: Aug. 27, 2009

(65) Prior Publication Data
US 2010/0058473 A1 Mar. 4, 2010

Related U.S. Application Data

(60) Provisional application No. 61/092,602, filed on Aug. 28, 2008.

(51) Int. Cl.
G06F 21/56 (2013.01)
(52) U.S. Cl.
CPC ............ G06F 21/566 (2013.01); G06F 21/563 (2013.01)
USPC ..................... 726/24; 726/22; 726/23; 726/25
(58) Field of Classification Search
None
See application file for complete search history.

(56) References Cited

U.S. PATENT DOCUMENTS

| 6,357,008 | B1* | 3/2002 | Nachenberg | 726/24 |
| 7,065,789 | B1* | 6/2006 | Neyman et al. | 726/24 |
| 7,089,591 | B1 | 8/2006 | Chi | |
| 7,624,449 | B1* | 11/2009 | Perriot | 726/24 |
| 7,712,132 | B1* | 5/2010 | Ogilvie | 726/22 |
| 2002/0066024 | A1 | 5/2002 | Schmall et al. | |
| 2003/0061502 | A1 | 3/2003 | Teblyashkin et al. | |
| 2005/0022016 | A1* | 1/2005 | Shipp | 713/201 |
| 2005/0223238 | A1 | 10/2005 | Schmid et al. | |
| 2007/0079375 | A1* | 4/2007 | Copley | 726/22 |
| 2007/0261112 | A1* | 11/2007 | Todd et al. | 726/11 |
| 2008/0022405 | A1* | 1/2008 | Wang et al. | 726/23 |
| 2008/0066180 | A1* | 3/2008 | Repasi et al. | 726/24 |
| 2008/0168533 | A1 | 7/2008 | Ozaki et al. | |
| 2009/0064337 | A1* | 3/2009 | Chien | 726/25 |
| 2010/0031358 | A1* | 2/2010 | Elovici et al. | 726/24 |
| 2011/0047618 | A1* | 2/2011 | Evans et al. | 726/23 |

FOREIGN PATENT DOCUMENTS

| JP | 2008/158686 A | 7/2008 |
| WO | WO 2004/021197 A1 | 3/2004 |
| WO | WO 2008/005067 A1 | 1/2008 |

OTHER PUBLICATIONS

Kruegel C et al; "Static disassembly of obfuscated binaries"; Proceedings of the 13th Usenix Securtiy Symposium—Aug. 9-13, 2004; San Diego, CA, USA; Jan. 1, 2004, pp. 255-270, XP009131682, the whole document; paragraph [04.3].

(Continued)

Primary Examiner — Jung Kim
Assistant Examiner — Adrian Stoica
(74) Attorney, Agent, or Firm — Pepper Hamilton LLP

(57) ABSTRACT

A method of detecting malware at a computing device. The method includes examining a software program comprising a sequence of program instructions, determining whether each instruction in the sequence meets any of a group of suspicion criteria, assigning a instruction-level score to each instruction that meets any of the suspicion criteria, summing the instruction-level scores for each instruction to yield a program-level score, determining whether the program-level score exceeds a threshold, and, if the program-level score exceeds a threshold, developing a report indicating a malware detection result.

17 Claims, 4 Drawing Sheets

(56) References Cited

OTHER PUBLICATIONS

Christodorescu M et al; "Static Analysis of Executables to Detect Malicious Patterns"; Proceedings of the Usenix Security Symposium, XX, Aug. 4, 2003, pp. 169-186, XP002333005; the whole document.

Linn C et al; "Obfuscation of Executable Code to Improve Resistance to Static Disassembly"; Proceedings of the 10th, ACM Conference on Computer and Communications Security, (CCS'03); Washington, DC, Oct. 27-31, 2003; [ACM Conference on Computer and Communications Security], New York, NY; ACM, US; vol. CONF. 10; Oct. 27, 2003, pp. 1-10, XP003006997; ISBN: 978-1-58113-738-5; the whole document.

Christodorescu M et al; "Static Analysis of Executables to Detect Malicious Patterns"; Proceedings of the Usenix Security Symposium, XX, Aug. 4, 2003, pp. 169-186.

\* cited by examiner

HEURISTIC METHOD OF CODE ANALYSIS

CROSS REFERENCE TO RELATED APPLICATIONS

This application claims the priority benefit of U.S. Provisional Application No. 61/092,602 filed Aug. 28, 2008.

BACKGROUND

The present disclosure relates to identification and analysis of data transferred via a communications network, and more particularly to identification, detection and analysis of harmful or malicious software or data.

As computer network technology and infra structure have improved over the years, the amount and speed of data transferred between computer network devices has drastically increased. Among this transferred data is a class of data referred to as malware. Malware, or malicious software, is a computer program designed to infiltrate a computing device without the device owner's knowledge or consent. Malware has come to refer to a generic class of software including a variety of hostile, intrusive or otherwise annoying forms of software or computer code. Malware includes various viruses, worms, trojan horses (or trojans), rootkits, spyware, adware and any other unwanted malicious software. Various types of malware may collect personal information related to a user and send this information back to an information collecting device. Other types of malware may cause a computing device to function poorly, or to not function at all.

One attempt at identifying and removing malware is antivirus software. Conventional antivirus software uses search sequences and rules-based analysis to look for known malware. However, malware code may be frequently changed by the malware program author such that search sequences and rides-based analysis may fail to detect updated programs.

Newer antivirus software uses more advanced and sophisticated identification techniques, especially when trying to detect new and unknown malware programs. Existing malware programs may share similar patterns of commands that, regardless of the actually coding used to implement the malware, may be identified by the antivirus software. However, such methods are not very useful for detecting new and unknown viruses having no previously detected pattern of operation.

To address this problem, recently-developed antivirus software detection methods evaluate suspicious program behavior. If antivirus software finds major differences from what may be called "good manners," an antivirus software application may assume that it has detected a new virus or malware program. These methods may be referred to using the overall term of "heuristic" malware detection methods. Typically, a heuristic analysis means that the examined program is being launched in some isolated and safe environment, and the method investigates its performance. The method tries to collect as much information as possible and evaluate whether an examined program's performance can be considered legitimate, or whether the program strives for something unusual or dangerous. If suspicious activity is detected, the program may be categorized as suspicious or even harmful.

Heuristic analysis can provide several advantages. It works regardless of whether the examined program have been examined in the past. It can also recognize new viruses and trojans. However, there are some disadvantages as well. These include:

1) Lack of accuracy. No heuristic method can be considered fully accurate. The border between correct and harmful software behavior can be foggy. Therefore, false alarms on clean programs, as well as missed detections of real malware, can be common.

2) Time demands. It is very time demanding to launch a program in a safe environment where one can be sure that no harm will result.

3) Countermeasures. Malware authors use number of tricks to prevent this type of analysis. It is extremely difficult to avoid all traps and intrigues.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, die singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method of detecting malware at a computing device. The method includes examining, by a processor of the computing device, a software program comprising a sequence of program instructions stored on a computer readable medium operably connected to the processor; determining, by the processor, whether each instruction in the sequence meets any of a group of suspicion criteria; assigning, by the processor, a instruction-level score to each instruction that meets any of the suspicion criteria; summing, by the processor, the instruction-level scores for each instruction to yield a program-level score; determining, by the processor, whether the program-level score exceeds a threshold; and if the program-level score exceeds a threshold, developing, by the processor, a report indicating a malware detection result.

In another general respect, the embodiments disclose a method of detecting malware at a computing device. The method includes the step of running, by a processor of the computing device, a software analysis program. Specifically, running the software analysis program comprises loading, by the processor, a sequence of program instructions stored on a computer readable medium operably connected to the processor; examining, by the processor, each program instruction in the sequence as it is executed; determining, by the processor, whether each instruction in the sequence meets any of a group of suspicion criteria during execution; assigning, by the processor, a instruction-level score to each instruction that meets any of the suspicion criteria; summing, by the processor, the instruction-level scores for each instruction to yield a program-level score; determining, by the processor, whether the program-level score exceeds a threshold; and if the program-level score exceeds a threshold, developing, by the processor, a report indicating a malware detection result.

In one general respect, the embodiments disclose a method of detecting malware at a computing device. The method includes examining, by a processor of the computing device, a software program comprising a sequence of program instructions stored on a computer readable medium operably connected to the processor; determining, by the processor, whether each instruction in the sequence meets any of a group of suspicion criteria, wherein the group of suspicion criteria comprises a determination of whether the instruction results in a transformation of data, a determination of whether the instruction causes a jump into another instruction, and a determination of whether at least two sequential instructions have identical meanings; assigning, by the processor, a instruction-level score to each instruction that meets any of the suspicion criteria; summing, by the processor, the instruction-level scores for each instruction to yield a program-level score; determining, by the processor, whether the program-level score exceeds a threshold; and if the program-level score exceeds a threshold, developing, by the processor, a report indicating a malware detection result.

BRIEF DESCRIPTION OF THE DRAWINGS

Aspects, features, benefits and advantages of the present invention will be apparent with regard to the following description and accompanying drawings, of which:

FIG. 1 illustrates exemplary code related to a technically pure software program;

FIG. 2 illustrates exemplary code related to a malicious software program;

DETAILED DESCRIPTION

Figure 3:
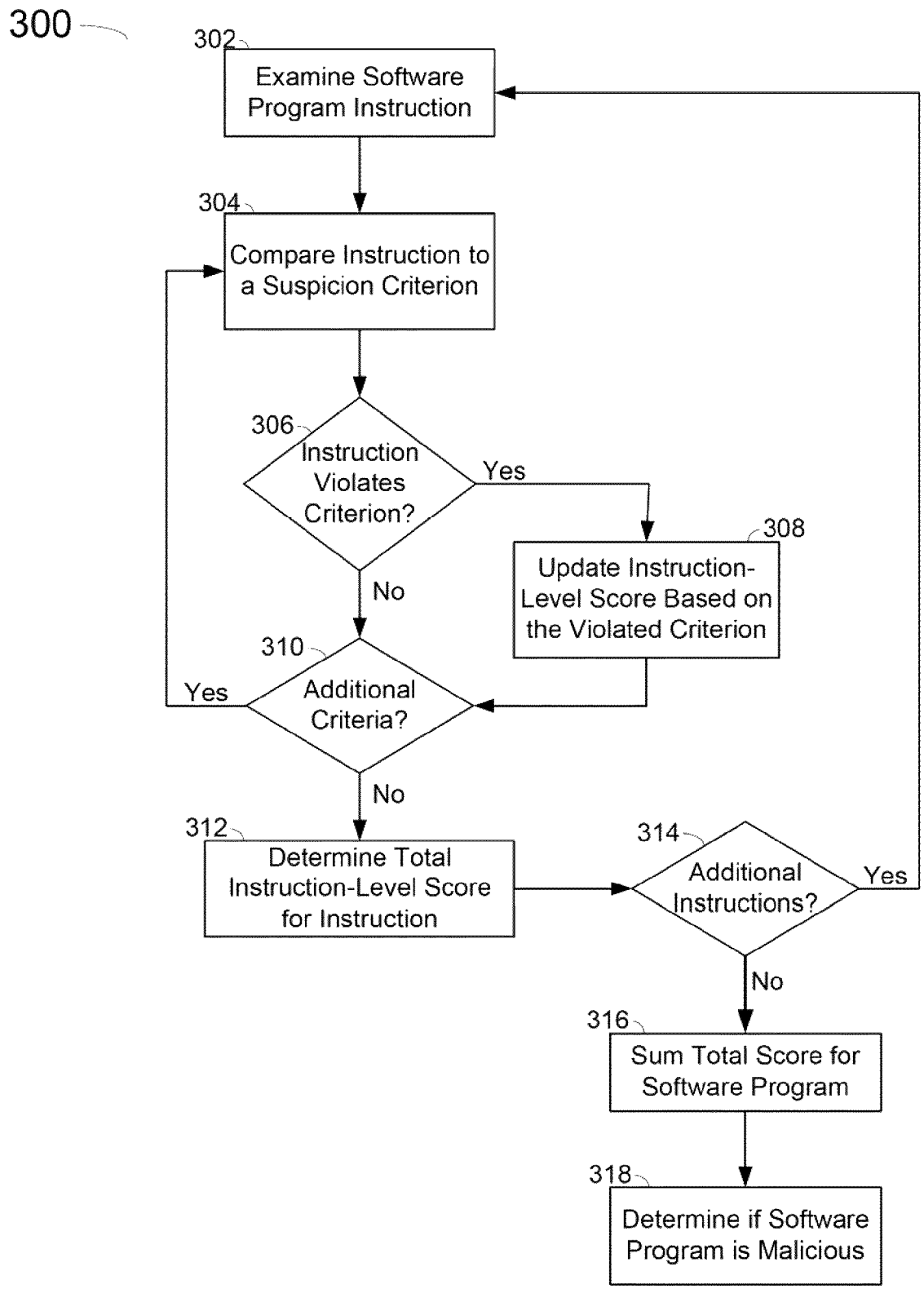
FIG. 3 illustrates an exemplary malware detection process.

The present disclosure describes new heuristic methods that analyze a potentially-suspicious program that function without running the program in an actual operating environment, thereby eliminating the potential for the suspicious program to perform any harmful operations. As mentioned above, heuristic malware detection methods may examine a suspicious program while it is running in safe environment, a method referred to herein as the "dynamic" method. However, these dynamic approaches have various drawbacks related to the time and resources required to run the software in a safe environment. In contrast, methods described below as a "static" method of heuristic analysis examine the suspicious program code without running the suspicious program.

The present disclosure further describes a static method for analyzing program code. This analysis is not performed from merely a scope based on a program behavior but rather from a scope based on technical purity. This method looks for differences in the program code as compared to the program code produced by common "official" tools. As used herein, the term "official tools" refers to commonly used compilers and run-time compressors. The method described in this disclosure supposes that the program code created in a standard and correct way may be technically pure, functionally straightforward and free from any malicious coding tricks included to block the analysis.

The technical purity itself may help to differentiate correct code from code that includes various illogical or redundant instructions, unnecessary jumps, roughly non-optimized processing flow etc. The more the malware authors try to block the analysis, the more similar illogical issues and technical errors may be found in the malicious code.

Figure 1:
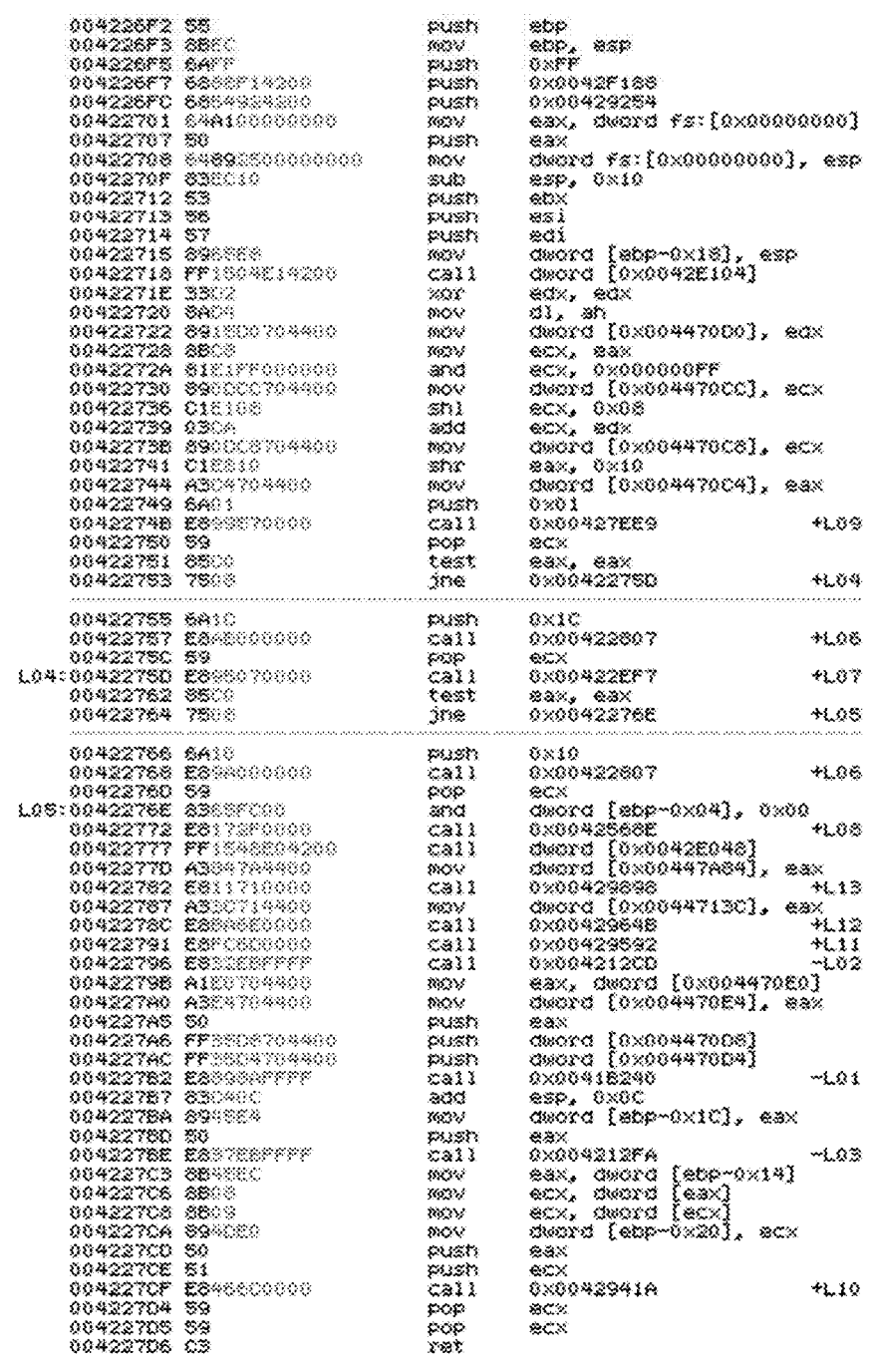

FIG. 1 illustrates an exemplary sequence of program instructions created in an official tool, in this example by Microsoft Visual C++ 6.0, may look like. The code shown in FIG. 1A is a well known and harmless WGET.EXE program. The WGET.EXE code is technologically pure and has no useless or illogical operations.

Figure 2:
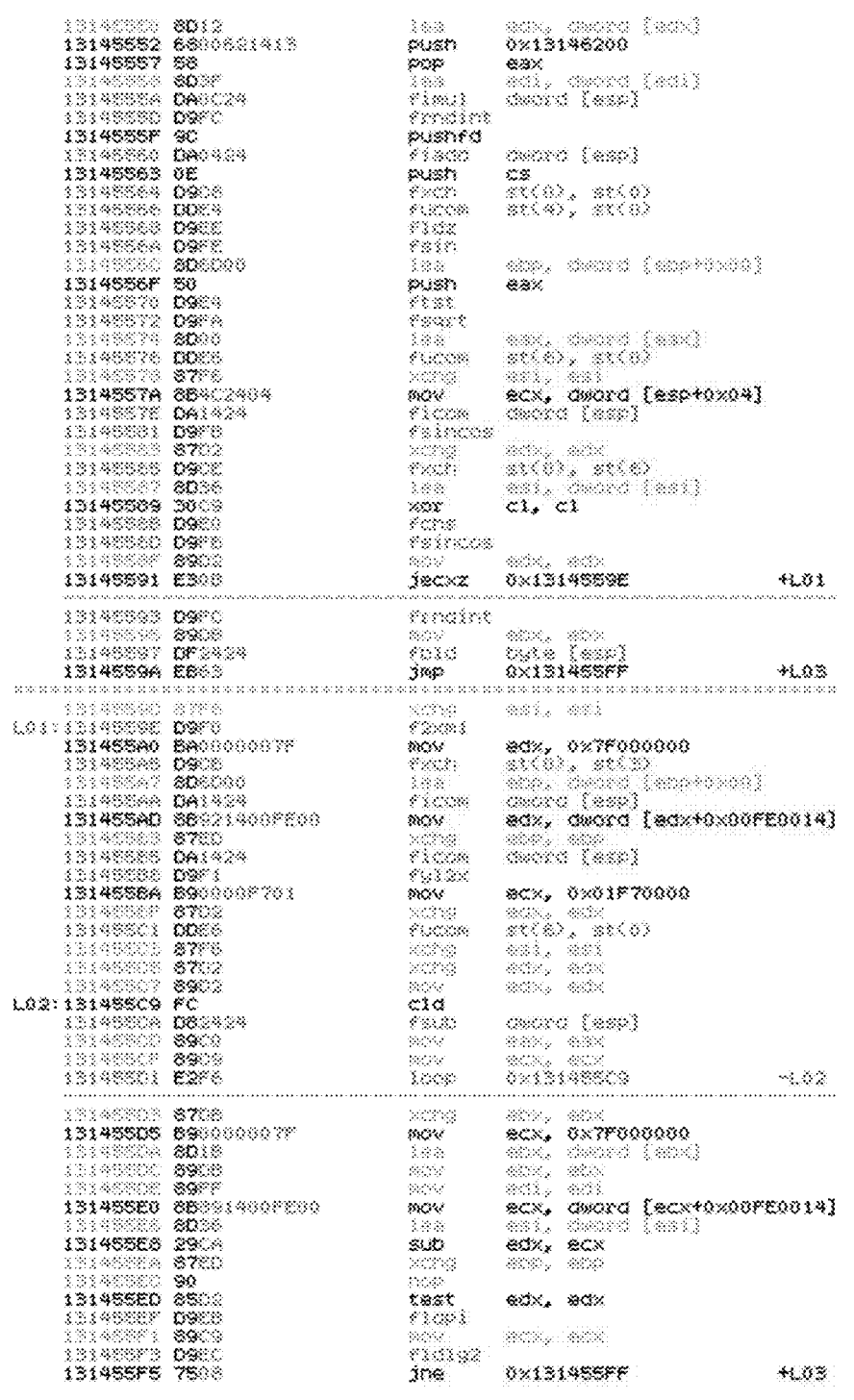

In contrast to the technically pure code shown in FIG. 1, FIG. 2 illustrates the opposite extreme, an example of a malicious trojan worm. Instructions contained in the trojan worm that have absolutely no meaning within the given context, i.e., their only intention is to block the analysis of the code and therefore the detection of the code as malware, are displayed in different shading (e.g., lines 1314555A and 1314555D).

The example shown in FIG. 2 illustrates that the trojan worm program contains minimal correct and meaningful instructions (displayed in black), while most of the program code consists of meaningless garbage. If an expert sees such a program, the expert can tell immediately that something is wrong with the code, and the program is more than likely malicious. Thus, it is desirable to program virus detection software to function as an expert, analyzing the technical purity of the code while not merely getting hung up in clever coding tricks and techniques implemented to fool the antivirus software.

FIG. 3 illustrates an exemplary process 300 for heuristically analyzing and detecting malware programs. Initially, the process loads each of a sequence of program instructions examines 302 one of the program instructions included in the software program. Depending on the analysis process or software, or operating environment of the analysis software, each instruction of the sequence may be loaded individually, or a module including multiple instructions may be loaded at once for examination 302. Similarly, one instruction may be analyzed at a time, or based upon the resources available, multiple instructions may be analyzed simultaneously. For simplicity purposes, in exemplary process 300, a single instruction is analyzed at a time.

During examination 302, the instruction is compared 304 to a suspicion criterion. Collectively, suspicion criteria rate each instruction based upon the expected outcome of the instruction when run. Different results of the analyzed instruction may satisfy various of the suspicion criteria, and based upon these results, an instruction-level score may be assigned to each instruction. The analyzing software may examine each instruction and determine 306 if the instruction violates some or all of the following criteria:

1) Whether the examined instruction actually performs some action. For instance, if the content of a 32-bit register rotates by 32 bits, the data should stay the same. The scoring system makes a note on this fact and "fines" such an instruction by an adequate number of penalties. A fine may be a negative score, or it may be an assigned numeric point system where total scores that exceed a predetermined level are presumed to indicate the presence of malware.

2) Whether the examined instruction belongs to an instruction group that actually does not change or alter the data. For instance, two sequential negations of the same registry mean that the registry content has not changed at all. Again, this will be fined by a reasonable number of penalties.

3) Whether the examined instruction jumps into the middle of another instruction. The analyzing software may be able to recognize such a trick, and it may fine it by a high number of penalties.

4) Whether two sequential instructions have the same meaning. For instance, if the string operations direction by STD instruction is set, and immediately afterwards the same instruction is carried out again, the latter instruction is quite redundant and therefore suspicious. Again, it will be penalized.

5) Whether some specific flag is being set that is not further used, or it is set up independently once again. For instance, if a comparison is performed, and then another comparison is performed, the result of the latter comparison overwrites the first result. This instruction is also penalized.

6) Whether the data rotation is meaningful. If some registry or a memory section is being rotated by more bits then the operand bit width is being rotated, the instruction may be considered illogical and it is penalized.

7) Other features that are not quite suspicious but at least unusual. For example: use of floating point instructions at the entry point, prefix concatenation, frequent use of various uneven variables, etc.

Any of the above described situations, if detected in the instruction, may result in the instruction-level score updating 308 to reflect a certain number of penalties assigned to a specific criterion based on experience, comparison to code or instruction sequences generated by an official tool. Exact number of penalties for specific situations may be determined based on a long-term and extensive testing. The penalties may be revised for different situations as the system gains experience with additional programs.

If the analysis determines 306 that an instruction does not violate a specific criterion, or if the instruction has violated the criterion and the instruction-level score has updated 308, the process may determining 310 if there are additional suspicion criteria to compare 304 the instruction to. If there are additional criteria, the instruction is further compared 304 and analyzed, possibly resulting in another update 308 of the instruction level score. Conversely, if there are no additional criteria to compare 304 the instruction to, a total instruction-level score may be determined 312 for the examined instruction.

A determination 314 may be made as to whether there are any additional instructions to examine 302. If there are additional instructions in the sequence of instructions, the process returns to examine 302 and compare 304 the additional instructions to the suspicion criteria. Once all instructions are examined 302, compared 304, and all instruction-level scores are determined 312, the total score for the software program may be summed 316. This summing 316 may be simply an adding of each of the Instruction-level scores, or may include various multipliers based upon the number of individual criteria the software program violates. Based upon this sum 316, the software program is determined 318 to be either harmless or malicious. This determination 318 may be based upon a comparison of a similar software program coded by an official tool, such as the code illustrated in FIG. 1. This determination 318 may also be based solely upon an examination of the score of the software program and an acceptable threshold set by the analyzing program for identifying malware, i.e., if the score is above a certain number, the software program is identified as malicious. Once identified, a report may be created indicating the results of the determination 318 and, depending on the application, further analysis of the software program may be performed.

Figure 4:
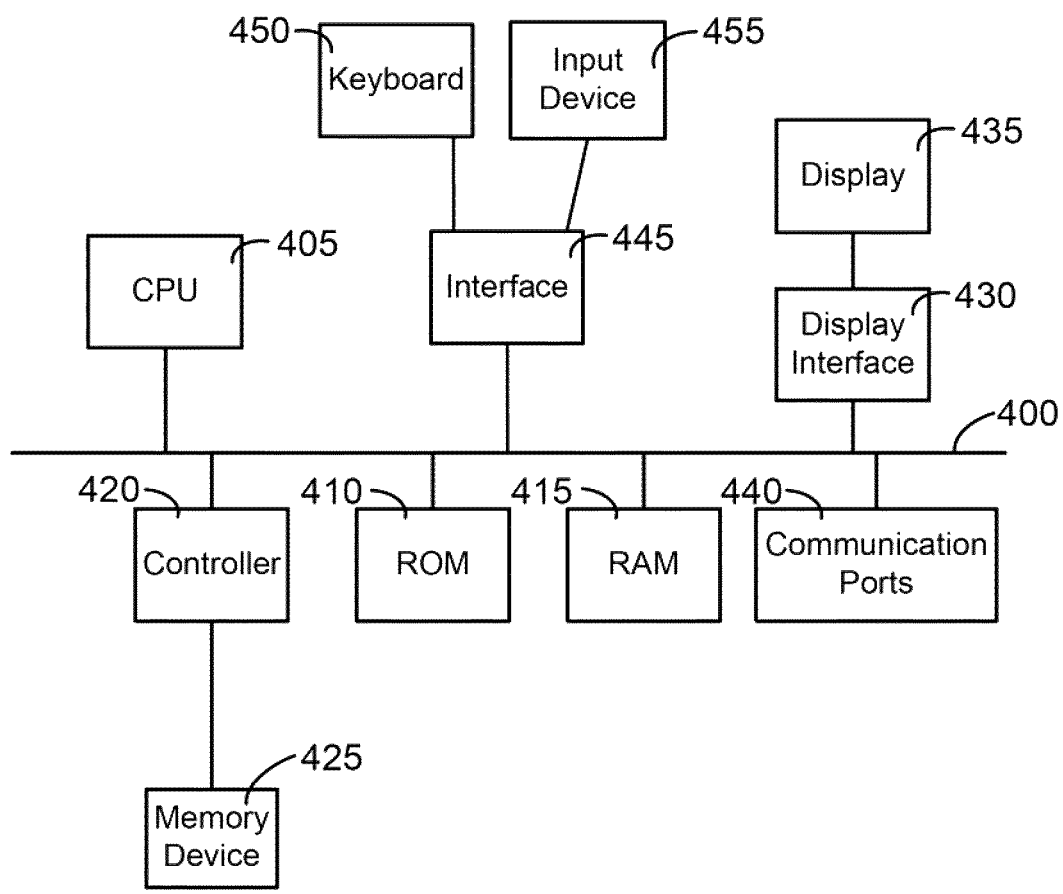
FIG. 4 illustrates an exemplary computing device for implementing the process described in FIG. 3.

FIG. 4 depicts a block diagram of exemplary internal hardware that may be used to contain or implement program instructions such as the malware detection process described in FIG. 3. A bus 400 may serve as the main information highway interconnecting the other illustrated components of the hardware. CPU 405 may be the central processing unit of the system, performing calculations and logic operations required to execute a program. Read only memory (ROM) 410 and random access memory (RAM) 415 may constitute exemplary memory devices.

A controller 420 may interface with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It should be noted the heuristic analysis process discussed herein may be launched on any program section. In some situations, it may be sufficient to examine only a portion of the code, such as the first 512 bytes on the entry point. While an emulator that has to launch the entire program and go through loops with millions of cycles before it actually finds something important, the above described heuristic may provide its results within milliseconds.

It should be appreciated that various of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of detecting malware at a computing device, comprising:
    conducting, by a processor of the computing device, a static evaluation of program instructions in a software program comprising a sequence of instructions stored on a computer readable medium operably connected to the processor, wherein the static evaluation is conducted without performing the program instructions;
    comparing, by the processor, each instruction in the sequence against each of a group of suspicion criteria, wherein the suspicion criteria are used to rate each instruction based upon an expected outcome of an instruction when run;
    determining, by the processor, whether each instruction in the sequence violates any of the group of suspicion criteria;
    assigning, by the processor, an instruction-level score to each instruction that violates any of the suspicion criteria, wherein the instruction level score reflects one or more of experience, comparison to other code generated by an official tool, or comparison to other instruction sequences generated by an official tool;
    summing, by the processor, the instruction-level scores for each instruction to yield a program-level score;
    determining, by the processor, whether the program-level score exceeds a threshold; and
    if the program-level score exceeds a threshold, developing, by the processor, a report indicating a malware detection result.

2. The method of claim 1, wherein the examining further comprises loading each instruction in the sequence of instructions from the computer readable memory.

3. The method of claim 1, wherein the suspicion criteria comprise a determination of whether the instruction results in a transformation of data.

4. The method of claim 1, wherein the suspicion criteria comprise a determination of whether the instruction belongs to a group of instructions that, collectively, do not result in a transformation of data when the group of instructions completes operation.

5. The method of claim 1, wherein the suspicion criteria comprise a determination of whether the instruction causes a jump into another instruction.

6. The method of claim 1, wherein the suspicion criteria comprise a determination of whether at least two sequential instructions have identical meanings.

7. The method of claim 1, wherein the suspicion criteria comprise a determination of whether the instruction establishes a flag that is not used by any other instruction.

8. The method of claim 1, wherein the suspicion criteria comprise a determination of whether the instruction causes meaningful data rotation.

9. A method of detecting malware at a computing device, comprising:
  running, by a processor of the computing device, a static software analysis program, wherein the running comprises:
    loading, by the processor, a sequence of program instructions stored on a computer readable medium operably connected to the processor, wherein the loading is conducted without performing the program instructions,
    examining, by the processor, each program instruction in the sequence,
    comparing, by the processor, each program instruction in the sequence against each of a group of suspicion criteria, wherein the suspicion criteria are used to rate each instruction based upon an expected outcome of a program instruction when run,
    determining, by the processor, whether each instruction in the sequence violates any of the group of suspicion criteria during execution,
    assigning, by the processor, an instruction-level score to each instruction that violates any of the suspicion criteria, wherein the instruction level score reflects one or more of experience, comparison to other code generated by an official tool, or comparison to other instruction sequences generated by an official tool,
    summing, by the processor, the instruction-level scores for each instruction to yield a program-level score,
    determining, by the processor, whether the program-level score exceeds a threshold, and
    if the program-level score exceeds a threshold, developing, by the processor, a report indicating a malware detection result.

10. The method of claim 9, wherein the suspicion criteria comprise a determination of whether the instruction results in a transformation of data.

11. The method of claim 9, wherein the suspicion criteria comprise a determination of whether the instruction belongs to a group of instructions that, collectively, do not result in a transformation of data when the group of instructions completes operation.

12. The method of claim 9, wherein the suspicion criteria comprise a determination of whether the instruction causes a jump into another instruction.

13. The method of claim 9, wherein the suspicion criteria comprise a determination of whether at least two sequential instructions have identical meanings.

14. The method of claim 9, wherein the suspicion criteria comprise a determination of whether the instruction establishes a flag that is not used by any other instruction.

15. The method of claim 9, wherein the suspicion criteria comprise a determination of whether the instruction causes meaningful data rotation.

16. A method of detecting malware at a computing device, comprising:
  conducting, by a processor of the computing device, a static evaluation of program instructions in a software program comprising a sequence of program instructions stored on a computer readable medium operably connected to the processor, wherein the static evaluation is conducted without performing the program instructions;
  comparing, by the processor, each instruction in the sequence against each of a group of suspicion criteria, wherein the suspicion criteria are used to rate each instruction based upon an expected outcome of an instruction when run;
  determining, by the processor, whether each instruction in the sequence violates any of the group of suspicion criteria, the group of suspicion criteria comprising:
    a determination of whether the instruction results in a transformation of data,
    a determination of whether the instruction causes a jump into another instruction, and
    a determination of whether at least two sequential instructions have identical meanings;
  assigning, by the processor, an instruction-level score to each instruction that violates any of the suspicion criteria, wherein the instruction level score reflects one or more of experience, comparison to other code generated by an official tool, or comparison to other instruction sequences generated by an official tool;
  summing, by the processor, the instruction-level scores for each instruction to yield a program-level score;
  determining, by the processor, whether the program-level score exceeds a threshold; and
  if the program-level score exceeds a threshold, developing, by the processor, a report indicating a malware detection result.

17. The method of claim 16, wherein the examining further comprises loading each instruction in the sequence of instructions from the computer readable memory.

* * * * *